REGISTER FOR TYPE COMPOSING APPARATUS

Filed Sept. 29, 1950 6 Sheets-Sheet 1

INVENTORS.
RENÉ HIGONNET
LOUIS MOYROUD
BY Kenway, Jenney, Witter & Hildreth
ATTORNEYS Sept. 28, 1954 R. HIGONNET ET AL 2,690,249

REGISTER FOR TYPE COMPOSING APPARATUS

Filed Sept. 29, 1950 6 Sheets-Sheet 2

INVENTORS.
RENÉ HIGONNET
LOUIS MOYROUD

BY Kenway, Jenney, Witter & Hildreth

ATTORNEYS

INVENTORS.
RENÉ HIGONNET
LOUIS MOYROUD
BY Kenway Jenney Witter & Hildreth
ATTORNEYS Sept. 28, 1954 R. HIGONNET ET AL 2,690,249

REGISTER FOR TYPE COMPOSING APPARATUS

Filed Sept. 29, 1950 6 Sheets-Sheet 4

INVENTORS.
RENÉ HIGONNET
LOUIS MOYROUD
BY Kenway Jenney Witter & Hildreth
ATTORNEYS Sept. 28, 1954 R. HIGONNET ET AL 2,690,249

REGISTER FOR TYPE COMPOSING APPARATUS

Filed Sept. 29, 1950 6 Sheets-Sheet 5

INVENTORS.
RENÉ HIGONNET
LOUIS MOYROUD
BY Kenway Jenney Witter & Hildreth
ATTORNEYS INVENTORS
RENÉ HIGONNET
LOUIS MOYROUD
BY Kenway, Jenney, Witter & Hildreth
ATTORNEYS Patented Sept. 28, 1954 2,690,249

UNITED STATES PATENT OFFICE 2,690,249

REGISTER FOR TYPE COMPOSING APPARATUS

René Higonnet and Louis Moyroud, Cambridge, Mass., assignors to Graphic Arts Research Foundation, Inc., Cambridge, Mass., a corporation of Delaware Application September 29, 1950, Serial No. 187,476
In France March 1, 1946

Section 1, Public Law 690, August 8, 1946
Patent expires March 1, 1966

19 Claims. (Cl. 197—19)

Figure 1:
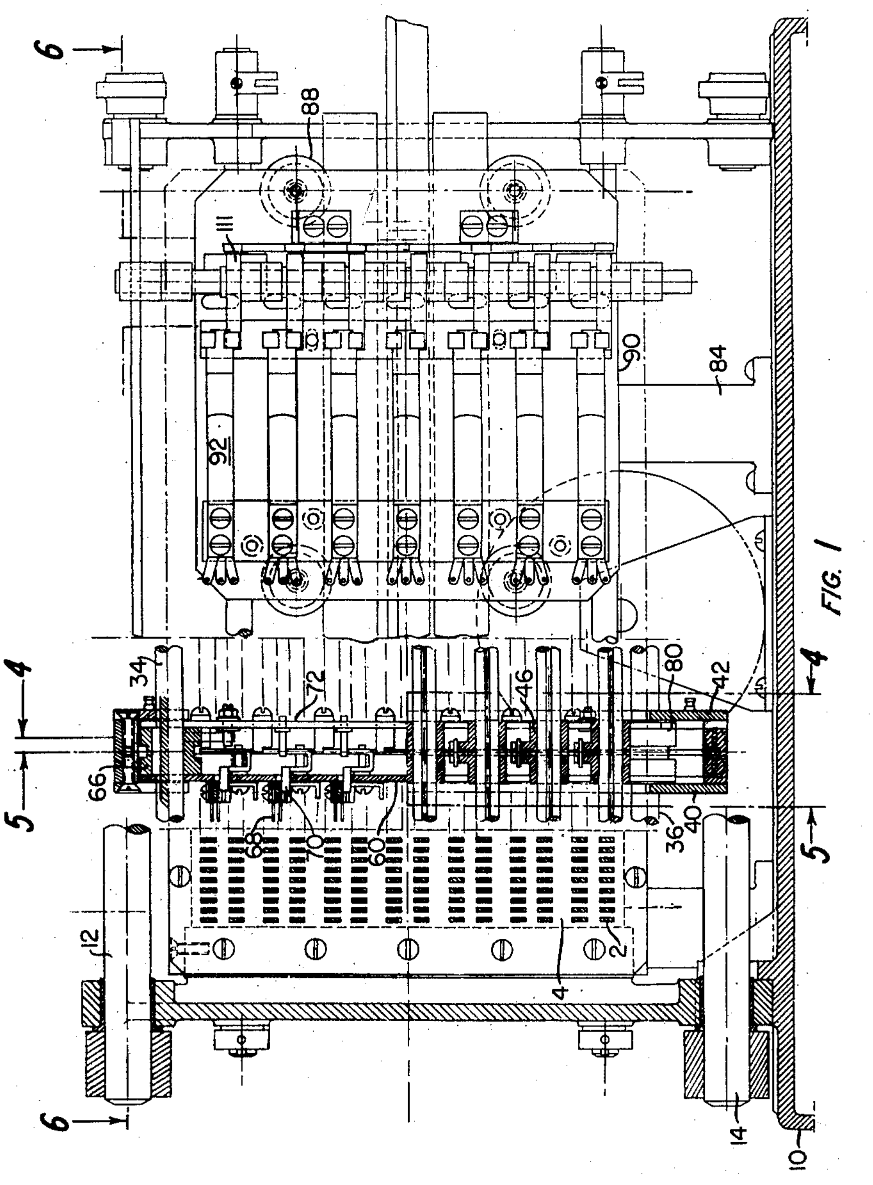

The present invention relates to type composing apparatus and more particularly to a register for storing information corresponding to selective keyboard operations, whereby the stored information is available at a later time. This application is a continuation-in-part of our copending application, Serial No. 770,320, filed August 23, 1947.

The invention concerns a register or memory device including storage devices which are adapted to assume a number of stable conditions to represent selective keyboard operations, selector devices under the control of the keyboard for "writing," or altering the condition of the storage devices according to the keyboard operations, and reading devices adapted to detect the information so stored at some subsequent period, and to make it available to other units of the composing apparatus for "transcription," or production of justified lines of characters.

An important object of the invention is to provide a register having provision for rapid and convenient erasure of stored information resulting from erroneous keyboard operations, such as misspelling or the like. Since the requirements of justification necessitate a delay between the writing of any particular information in the register and the reading thereof, it follows that the information stored in the register can most conveniently be corrected within the delay period, that is, before the reading devices transmit the information to the transcribing apparatus. Furthermore, since correction usually entails substitution of characters of different widths from those which were incorrectly stored, it also follows that appropriate correction provisions must be made for this difference prior to the computation of the justification increments for the line in which the correction appears.

Particularly in photographic type composing apparatus, it is desirable for the compositor to operate a non-justifying typewriter having adaptations of the keyboard suitable for actuation of the register as well as of the apparatus which is concerned primarily with the determination of justification requirements. Thus, the compositor is able to see the characters selected in complete lines, and is better able to determine whether correction is necessary.

Accordingly, a further object of the invention is to provide a register having a convenient linkage between the non-justifying typewriter and the selector devices of the register.

A feature of this invention is the provision of a mechanical connection between the platen of the non-justifying typewriter and the selector devices, whereby the selector devices are presented to successive groups of storage devices under the control of the same escapement mechanism which moves the platen of the non-justifying typewriter. This means that, while the selector devices are normally driven in one direction step-by-step as the line is composed, they may readily be returned to any desired position in order to permit the performance of the correction functions heretofore mentioned.

Another feature of the invention is the provision for a stationary field of storage devices arranged in a number of groups, with a "pitch," or distance between adjacent columns of storage devices, which is determined by the pitch of the toothed mechanism driving the non-justifying typewriter. To provide an example of the invention, the drawings and disclosure relate to specific embodiments in which the field is oriented in a vertical plane, and the order of the storage devices is binary.

Other features and objects of the invention relate to certain features of construction and modes of operation hereinafter described and particularly defined in the claims.

Figure 2:
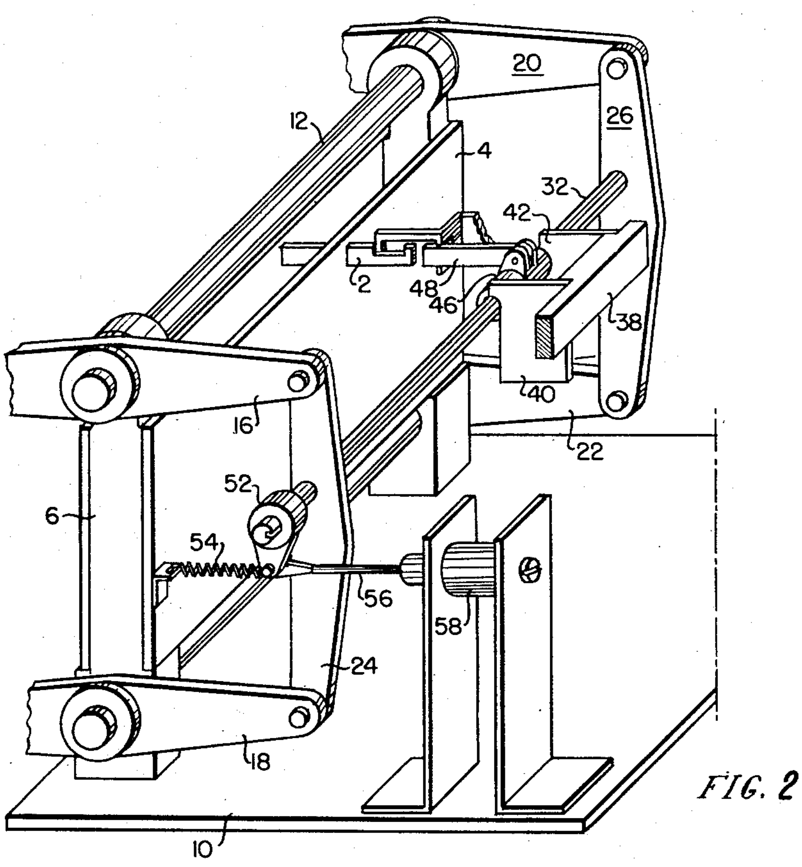
Figure 3:
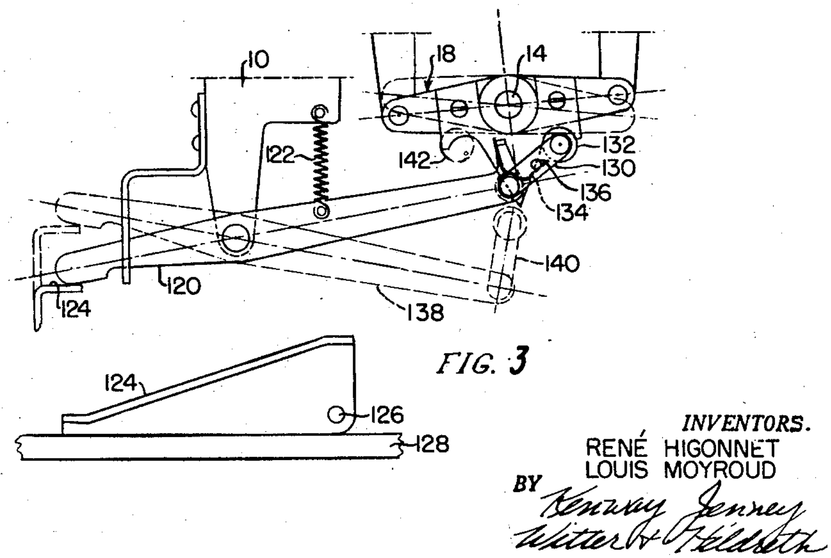
Figure 4:
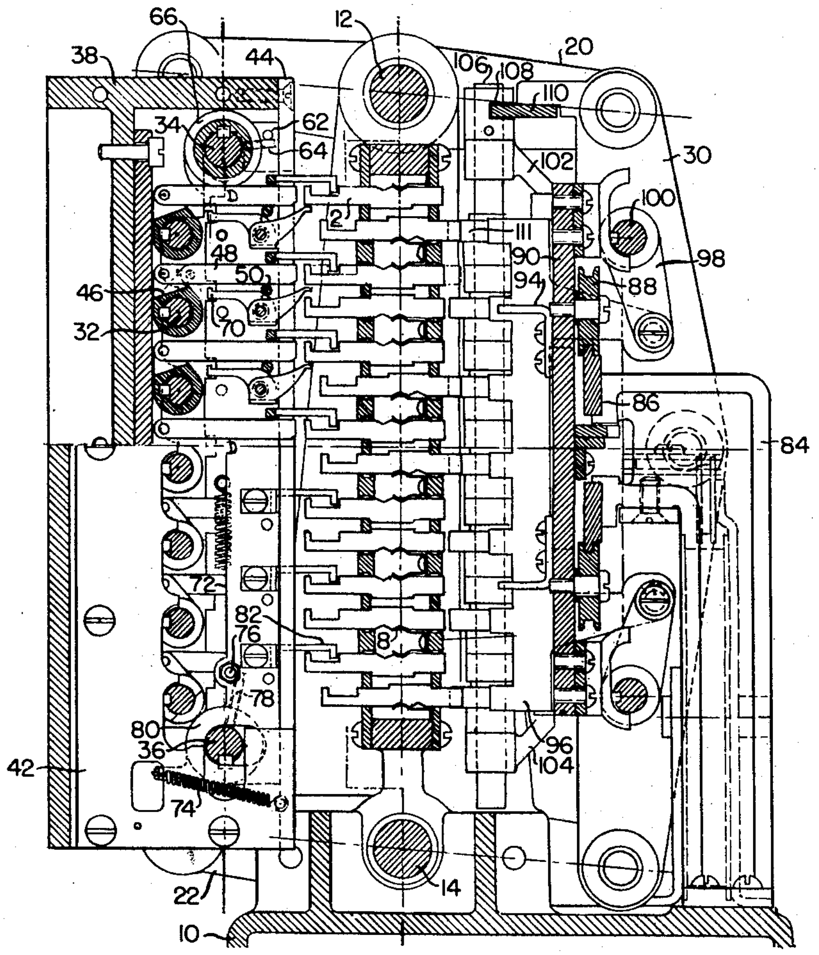
Figure 5:
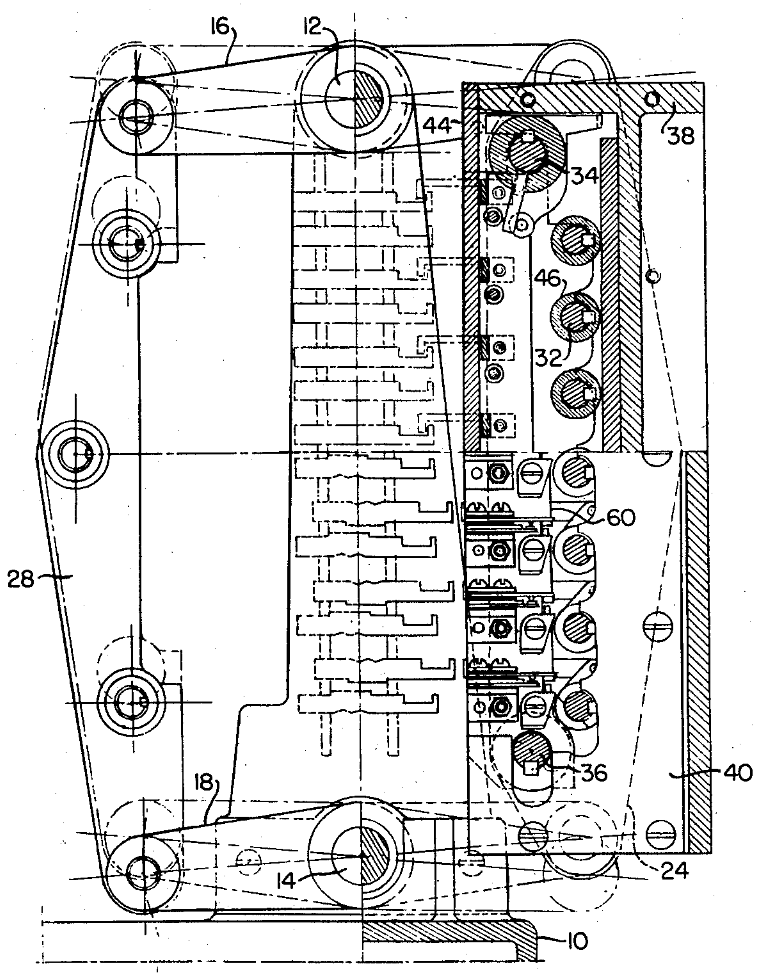
Figure 6:
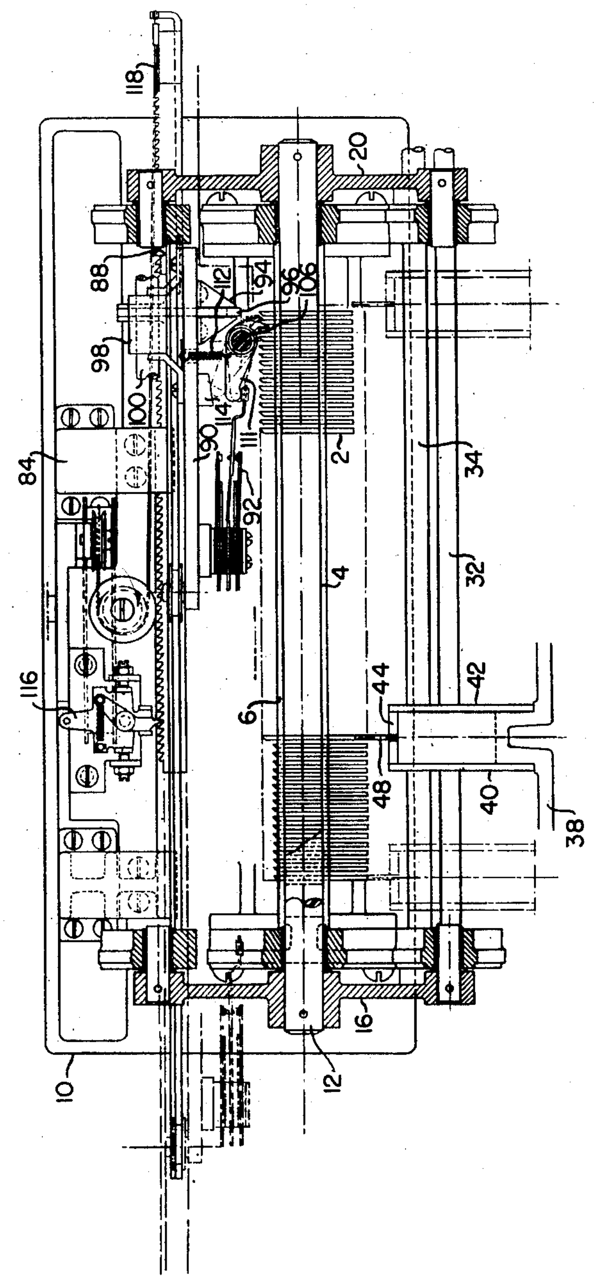
Figure 7:
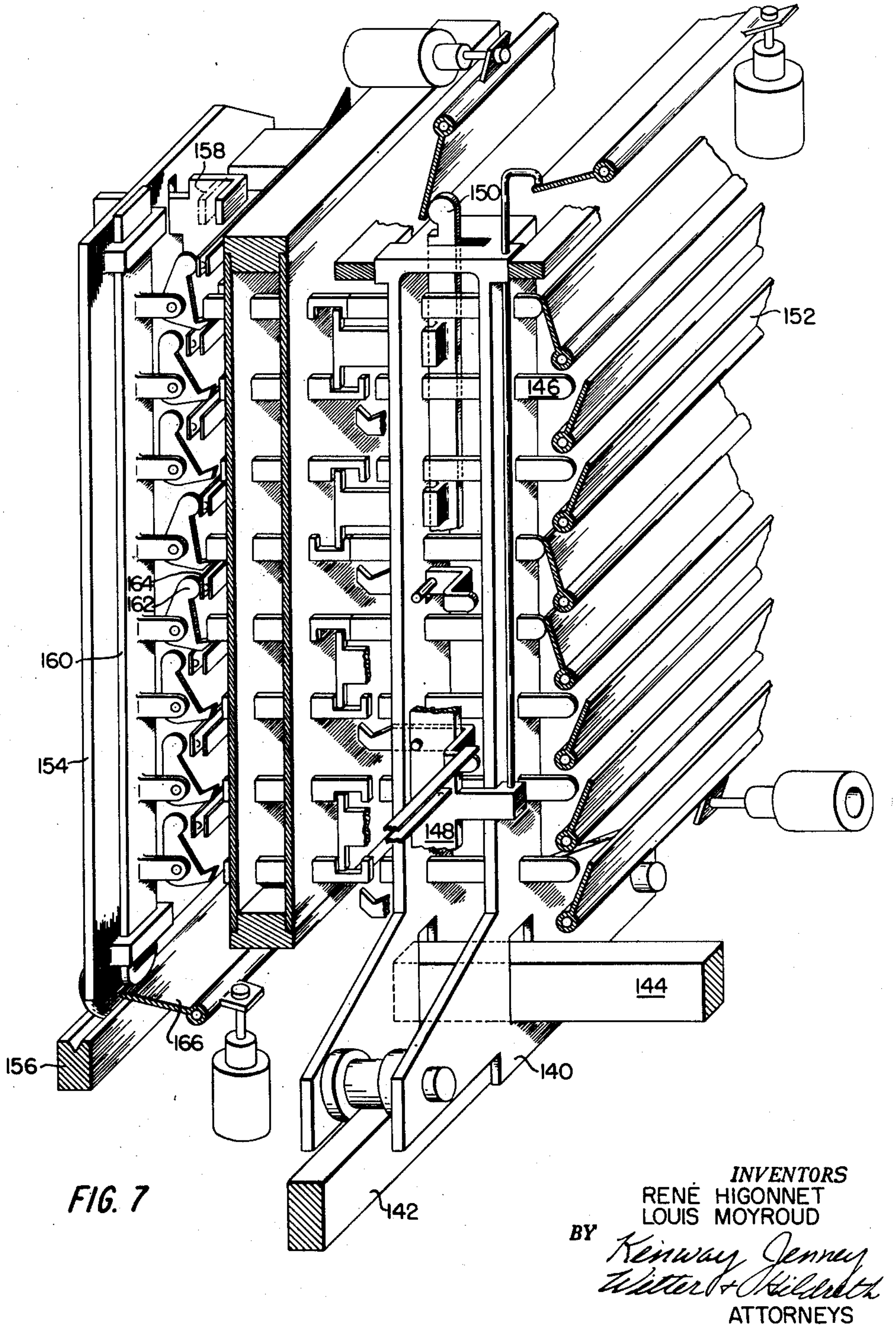

In the drawings, Fig. 1 is a projection of the register, partly cut away, parallel to the plane of the storage pins; Fig. 2 is a schematic view of the frame of the register; Fig. 3 is an end elevation of the frame-rocking mechanism; Fig. 4 is a composite of sectional views looking from the right end of Fig. 1; Fig. 5 is a composite of sectional views looking from the left end of Fig. 1; Fig. 6 is a top elevation of the register; Fig. 7 is a pictorial view of an alternative form of the invention; Fig. 8 shows a portion of Fig. 7 having an added safety feature; and Fig. 9 is a circuit diagram of the safety feature.

Turning to Fig. 1, the storage devices of the register are represented as a fixed, vertical, rectangular field of storage pins, such as 2, arranged in a number (shown as fourteen) of horizontal rows running the width of the register, the rows being paired to form seven horizontal groups of pins. The pins are supported by two fixed parallel plates 4 and 6 (Figs. 4 and 6), and each adjacent pair of pins is held by a U-shaped spring 8 (Fig. 4) so that each pin may reach either of two stable positions. For convenience, a pin which is pushed to the right as shown in Fig. 4 will be referred to as being in the "unit" position, and a pin which is pushed to the left will be referred to as being in the "zero" position.

The above arrangement is adapted to provide sufficient storage pins to store all of the key actuations in two complete lines of type. Thus, only seven pins are used to represent each key of the keyboard, and the particular pins representing any particular key are arranged in a vertical column, and comprise either the upper or the lower pin in each of the seven horizontal groups. As will hereinafter be described, the selecting parts of the register include seven hammers arranged in a vertical column and supported by a frame adapted to represent the hammers either to the upper or the lower pins in each group. For the first line the upper horizontal row of pins in each group is actuated; for the next line the lower row is actuated; for the third line the upper row, which by that time has been read and reset, is again actuated, and so on for each successive composed line.

Thus, the number of keys on the keyboard which the register can represent is found by raising the number of stable positions which the pins 2 may reach to a power equal to the number of pins representing any particular key. For the register shown in the drawings, this is $2^7$, or 128 keys. Obviously, increasing either of the two quantities mentioned would greatly expand this number, if more keys were necessary.

The reading devices of the register are driven by an independent escapement hereinafter to be more fully described, and are arranged always to read the opposite rows of storage pins from the rows then being actuated by the selector devices, or hammers.

The structure supporting both the selector and reading devices of the register is conveniently shown by Fig. 2. A fixed bed 10 rigidly supports the vertical plates 4 and 6. The bed and plates also support journal blocks for the rotatable support of two horizontal shafts 12 and 14. Four rocker arms 16, 18, 20 and 22 are keyed to the shafts 12 and 14 and are interconnected by four links 24, 26, 28 and 30 to form two mutable parallelograms. Because the rocker arms are keyed to common shafts, the links 24 and 26 move in fixed spatial relationship, and so also do the links 28 and 30.

The links 24 and 26 constitute the guide frame for the selector devices of the register. These links are shown schematically in Fig. 2, their true shapes being shown as dotted lines at the right in Fig. 5. Each link is provided with a vertical line of seven holes for the rotatable support of seven hammer shafts such as 32, and also with two holes slightly closer to the field of pins for the rotatable support of two correction shafts 34 and 36 (Fig. 5). The hammer and correction shafts are used as a means for guiding the selector devices as they are moved from left to right across the field of storage pins.

A vertical platen support 38, shown schematically in Fig. 2 and in partial side and top views in Figs. 5 and 6 respectively, is assumed to be attached to the platen of a non-justifying typewriter having a uniform spacing escapement. The embodiment shown in the drawings is adapted for a rigid connection between the platen support and platen, but it will hereinafter become more apparent that the connection may also be one in which the platen support is caused to move to the left or right with the platen, but to be free to move either up or down with respect to the platen.

To the platen support are screwed two vertical guide plates 40 and 42, schematically represented in Fig. 2, and in partial side and top views in Figs. 5 and 6, respectively. The guide plates are cut out to permit them to fit over the hammer and correction shafts, as shown in Fig. 5. It will be noted that the cut-outs are elongated so that when the rocker arms are moved up or down, the guide plates do not come into interference with the hammer and correction shafts. To the vertical edges of the guide plates nearest the field of storage pins is screwed a plate 44 having an elongated slit somewhat longer than the height of the field of storage pins and exactly halfway between the two guide plates. This slit is so located that when the escapement of the non-justifying typewriter is at rest the slit is exactly opposite a column of storage pins. The width of the slit is approximately the same as the width of the storage pins, which is preferably half the "pitch," or distance between adjacent storage pins.

The plates 40, 42 and 44 are therefore means for guiding the selector devices which cooperate with the storage pins, and which are slidably mounted on the hammer and correction shafts between the plates 40 and 42 as hereinafter described.

Hammers for moving the storage pins are mounted in a manner best described by reference to Fig. 2. A sleeve 46, slidably keyed by a feather on the hammer shaft 32, is retained between the plates 40 and 42. This sleeve has two ribs integral therewith between which a hammer 48 is pinned. The hammer is projected through the slit in the plate 44 and is prevented from falling out of an approximately horizontal position by a pin 50 projecting from the inside of the plate 40 underneath the hammer (Fig. 4). Keyed to the end of the hammer shaft 32 is a hammer lever 52 pinned on one side to a spring 54 connected to the plate 4, and on the other side to an extension of a plunger 56 in a fixed magnet 58. Thus, when the magnet 58 is energized the hammer 48 strikes a storage pin and drives it into the "unit" position.

Means for sensing the positions of the storage pins are carried on a sensing plate 60 (Figs. 1 and 5), fitted between the hammers and the plate 40 as shown in Fig. 1. The sensing plate has two vertically elongated holes fitting over the correction rods 34 and 36 in the manner shown by the upper left section of Fig. 4, and normally rests in its lowest position supported by the rod 34. A pin 62 projecting from the sensing plate cooperates with an arm 64 projecting from a slidable sleeve 66 on the shaft 34 (Figs. 1 and 4). The sleeve 66 is slidably keyed by a feather and is also held between the plates 40 and 42. The shaft 34 is rotated by a mechanism such as that for driving the hammer as shown in Fig. 2. Thus, by the rotation of the shaft 34 the sensing plate may be raised between the plates 40 and 42 to its upper extreme position.

Seven pairs of contacts such as 68 are screwed on one side of the sensing plate as shown in Fig. 1. Another view of these contacts is shown in the lower right section of Fig. 5. To the other side of the plate are pivoted seven dogs such as 70, each having at one end a projection through the slit in the plate 44 adapted to strike any storage pin in the "zero" position when the sensing plate is raised, and at the other end a projection extending through a notch in the sensing plate to operate the seven contacts. Different views of the dogs are shown in Figs. 1 and 4.

Means for retracting any storage pins from the "unit" position to the "zero" position are carried on an erasing plate 72 (Figs. 1 and 4), fitted between the hammers and the plate 42 as shown in Fig. 1. The erasing plate has two horizontally elongated holes fitting over the correction rods 34 and 36 in the manner shown by the lower left section of Fig. 4, and normally rests in its extreme right position by the bias of a spring 74. A pin 76 projecting from the erasing plate cooperates with an arm 78 projecting from a slidable sleeve 80 on the shaft 36 (Figs. 1 and 4). The sleeve 80 is slidably keyed by a feather and is also held between the plates 40 and 42. The shaft 36 is also rotated by a mechanism such as that for driving the hammers as shown in Fig. 2. Thus, by the rotation of the shaft 36 the erasing plate may be moved away from the field of storage pins. Seven extractors such as 82 integral with the erasing plate as shown in Fig. 4 are thus caused to withdraw any of the storage pins which are in the "unit" position.

We now turn to a description of the reading devices of the register. Referring to Fig. 4, a ribbed rail support 84 screwed to the bed 10 bears a pair of horizontal rails 86. These rails support four wheels such as 88 carrying a rectangular contact plate 90. Other views of the contact plate are shown in Figs. 1 and 6. The contact plate bears seven pairs of spring contacts such as 92 facing the field of storage pins. Toward one end of the contact plate and also facing the field of storage pins are screwed two brackets such as 94 (Figs. 4 and 6) having combs to support a vertical resetting plate 96 having seven projections, as shown in Fig. 4. Two extensions of the resetting plate through elongated grooves in the contact plate are pinned to two resetting levers such as 98, the other ends of the resetting levers being slidably keyed to resetting shafts such as 100 rotatably supported by the links 28 and 30. The shaft 100 is rotated by means such as are shown in Fig. 2 for driving the hammers. Thus, when the shaft 100 is rotated the resetting plate 96 is driven toward the field of storage pins and resets all pins in the path of its seven projections to their "zero" positions.

Secured to the contact plate 90 are two brackets 102 and 104 (Fig. 4) having sleeves for the vertical support of a shaft 106. The shaft is free to slide in the sleeves. A sleeve 108 is pinned to the upper end of the shaft. This sleeve has a groove into which is fitted a plate 110 fixed to an extension of the link 30. Between the brackets on the shaft 100 are seven feelers such as 111 (Figs. 1, 4, and 6). These feelers are not free to slide along the shaft, but may rotate freely. A spring 112 (Fig. 6) supplies a bias tending to move a projection of each feeler toward the field of storage pins, thereby moving the other end of the feeler away from a cooperating spring contact and against a fixed abutment 114 on the plate 90. Thus, when a feeler reaches a position where a storage pin is in the "units" position it actuates the contact 92 against the tension of the spring 112. Further, it may be seen from Fig. 4 that the position of the rocking mechanism determines which of the two sets of storage pins is to be "read" by the feelers. From the above description it will be evident that the structure for actuating the resetting plate 96 is such that the plate is raised and lowered with the feelers by reason of the connection of the resetting shaft 100 to the links 28 and 30, as shown in Fig. 4.

Mechanism to drive the contact plate 90 along the rails comprises an escapement mechanism 116 (Fig. 6), cooperating with a bias cord 118 in a manner similar to that of a typewriter. The escapement 116 is actuated by controls which are independent of the selector devices and which include the specific transcription means to be actuated by the register.

Mechanism to rock the selector and reading devices of the register after each line is shown in Fig. 3. A lever 120 is pivoted on a projection of the fixed bed 10. A spring 122 provides a counterclockwise bias urging the lever against a flanged surface of a cam 124. The cam 124 is pivoted by a pin 126 fixed to a projection 128 of the platen of the non-justifying typewriter. Referring to the side view of the cam 124, it may be seen that if the cam moves against the lever while moving from right to left the lever will be moved clockwise by the cam, but if the cam moves against the lever while moving from left to right the lever will make contact with the underneath side of the flange, the cam will merely be pivoted clockwise about the pin 126, and the lever 120 is not rotated.

At the end of the lever 120 is pivoted an arm 130 having a roller 132. A spring 134, cooperating with a peg 136 on the arm 130 and a lip on an extension of the arm 120, tends to cause the arm 130 to rotate counterclockwise about its pivot, so that if the two arms were free of the other elements of the mechanism, as when the arm 120 is rotated to a position 138, the arm 130 would reach a position 140, where it would be stopped by the lip on the extension of the arm 120. The rocker arm 18 has a wedge-shaped surface on its lower side against which the roller 132 is rested.

Assuming that the mechanism is in the position shown by full lines in Fig. 3, when the arm 120 is rotated by the cam 124 into the position 138 and is subsequently allowed to return to its original position the roller 132 will engage the left-hand surface of the wedge and will ultimately reach a position 142, thereby rocking the rocker arm 18 clockwise. The next time the the arm 120 is rotated by the cam into the position 138 and is then allowed to return to its original position the roller 132 will engage the right hand surface of the wedge, thereby rocking the rocker arm counterclockwise.

A brief summary of the operation of the register follows. Assuming that the platen of the non-justifying typewriter is at the left margin ready to begin a line, both the selector and reading devices are located opposite the left-hand column of storage pins. It will further be assumed that the selector devices are in their upper position and the reading devices are in their lower position. The keys of the keyboard are then operated, and the platen is automatically escaped in equal movements from left to right across the field of storage pins. The hammers are operated by magnets such as 58 (Fig. 2), which are energized according to the particular keys that are depressed. Meanwhile, the reading unit, moving independently under the control of its escapement 116 (Fig. 6) reads the set of storage pins which are not being actuated by the hammers. Immediately after each movement of the contact plate 90 the shaft 100 (Fig. 4) is rotated as heretofore described and the resetting plate 96 resets the pins which have just been read. Thus, it makes no difference whether the hammers are ahead or behind the feelers. When both units reach the end of the line the compositor returns the platen and the contact plate 90 to the left. Near the end of this return motion the cam 124 rocks the arm 120 and thereby causes the selector and reading devices to face opposite sets of the storage pins, on the next line.

Correction of a stored character is accomplished by simply returning the platen to the desired character in the unjustified line of typing and by successively operating the sensing and erasing plates as heretofore described, after which a correct character key may be depressed. The contacts on the sensing plate are connected to the justification apparatus of the machine and provide means for subtracting erroneous character width entries.

Another embodiment of the present invention is shown in Fig. 7. This embodiment differs from that of Figs. 1 through 6 principally in that the same horizontal rows of storage pins which are being actuated are simultaneously being read. Thus, for a register having seven pins to represent each keyboard operation, only half as many storage pins as in the former embodiment are necessary. (Actually, the register of Fig. 7 provides eight pins to represent each keyboard operation.) Also, the selector and reading devices do not rock between two rows of storage pins, but return after each row to the original position.

A selecting carriage 140 mounted on a fixed rail 142 is connected with the platen of the non-justifying typewriter through a bar 144 in a manner similar to that described above. This carriage carries hammers such as 146, a sensing plate 148 and an erasing plate 150 which are essentially the same as the analogous devices already described. Certain differences, however, will be noted. In place of the mechanism such as that shown in Fig. 2 for driving the hammer and correction shafts a number of magnetically rotated flat plates such as 152 are employed. Also, there are only half as many projections from the erasing plate 150, and each projection resets two storage pins instead of one.

A reading carriage 154 mounted on a fixed rail 156 carries a resetting plate 158 and a rocking plate 160. The rocking plate has eight projections to each of which is pinned a feeler 162 cooperating at the upper end with contacts such as 164. These contacts are supported by a support 165 on the reading carriage. When the rocking plate 160 is in its normal position, the other ends of the feelers are beneath the storage pins which they are to read. Rotation of a flat plate 166 raises the rocking plate at each position to detect the storage pins which are in their "unit" positions. The reading carriage is moved along the rail 156 by an escapement similar to the escapement 116 in Fig. 6.

The invention provides means to insure that the reading carriage, while moving from left to right, is always to the right of the selecting carriage. A cam-operated contact 168, shown in Fig. 8, is fixed to the selecting carriage 140 in position to cooperate with a cam arm 170 fixed to the reading carriage. The contact is actuated when the selecting carriage comes closer than about five columns from the reading carriage and actuates an electromagnet which freezes the typewriter bars until the reading carriage moves further ahead. It is, of course, necessary to prevent this electromagnet from being energized when the reading carriage passes the selecting carriage on the way toward the beginning of the next line. This is conveniently done by the circuit shown in Fig. 9. The contact 168 is in series with the winding of an electromagnet 172 for freezing the typewriter bars, the normally closed single-pole double throw contacts of relay 174, and a source of electrical potential 176. The relay 174 has a pickup coil connected to a wire 178 which is energized when the register reads the end-of-line signal, and a holding coil in series with the source 176, the normally-open contacts of the relay 174, and a normally-closed switch 180. The switch 180 is located at the left end of the register and is adapted to be opened by the reading carriage when the carriage reaches the beginning of the line.

Having thus described our invention, we claim:

1. In a photographic composing machine, a register unit comprising, in combination, a stationary storage section for retaining information, a selector section to be coupled to a typewriter platen and controlled thereby, and a reading section movable relative to the storage section, and arranged to read the stored information in one part of the storage section while the selector section is storing information in another part of the storage section.

2. In a photographic composing machine, a register unit comprising, in combination, a stationary storage section for retaining information, a selector section to be coupled to a typewriter platen and controlled thereby and having means for erasing faulty information in the storage section, and a reading section movable relative to the storage section, and arranged to read the stored information in one part of the storage section while the selector section is storing information in another part of the storage section.

3. In a photographic composing machine, a register unit to be controlled by a typewriter, comprising, in combination, a stationary storage section composed of memory elements for retaining information, a selector section to be coupled to a typewriter platen and controlled thereby and movable parallel to the storage section, and a reading section on the other side of the storage section, independently movable parallel thereto, and arranged to read the stored information in one part of the storage section while the selector section is storing information in another part of the storage section.

4. In a photographic composing machine, a register unit comprising, in combination, a stationary storage section parallel to the path of a typewriter platen composed of horizontal rows of memory elements for retaining information, the number of elements in a row being equal to the number of characters and spaces in the longest line, a selector section to be coupled to the typewriter platen and movable thereby and composed of selector devices equal in number to the rows of memory elements, and a reading section independently movable parallel to the storage section and composed of feelers to detect the position of the memory elements and arranged to read the stored information in one part of the storage section while the selector section is storing information in another part of the storage section.

5. In a photographic composing machine, a register unit as in claim 4 in which the selector section is provided with erasing means to reset the memory elements corresponding to a faulty character.

6. In a photographic composing machine, a register unit as in claim 4 in which the reading section is provided with resetting means for resetting the memory elements into their non-operative positions during the reading operation.

7. In a photographic composing machine, a register unit comprising, in combination, a stationary storage section parallel to the path of a typewriter platen, composed of two groups of horizontal rows of memory elements, each element being capable of assuming two positions, the number of elements in a row being equal to the number of characters and spaces in the longest line, the two groups being arranged in alternate rows, one group to record a new line while the other group is being read; a selector section to be coupled to a typewriter platen and movable thereby on one side of the storage section and composed of means adapted to cooperate with one group of memory elements, a reading section on the other side of the storage section and independently movable parallel thereto, composed of feelers to detect the position of one group of memory elements and means to reset the memory elements into their non-operative position; and means adapted to displace both the selector and reading sections vertically so as to alternately present said sections to one or the other group of memory elements.

8. In a photographic composing machine, a register unit comprising, in combination, a stationary rectangular storage section composed of two groups of rows of memory pins, each pin being capable of assuming two positions, each row being parallel to the path of a typewriter platen and having as many pins as there are characters and spaces in the longest line of composition, the two groups being arranged in alternate rows, a selector section to be coupled to the typewriter platen and controlled thereby and having a plurality of hammers adapted to actuate one group of memory pins corresponding to a selected character, a reading section on the other side of the storage section independently movable parallel thereto, composed of feelers to detect the position of the memory pins, contacts cooperating with said feelers to transmit the identity of a stored character, resetting means to reset the memory pins into their non-operating positions; and means for displacing vertically said selector and reading sections so as to present said sections to alternate rows of memory pins, whereby the reading section is presented to one group while the selector section is presented to the other group.

9. In a photographic composing machine, the combination of a typewriting machine having a laterally movable platen, a selector movable with said platen, a storage section having memory elements actuated by said selector, reading means for the storage section, erasing means engageable with the memory elements, and means operated by the machine operator upon setting the platen in relation to a typed faulty character to set the erasing means in operative relation to the memory elements corresponding to said character.

10. In a photographic composing machine, the combination of a typewriting machine having a laterally movable platen, a selector movable with said platen, storage means having memory elements arranged in code groups, each group being actuated by the selector to store information corresponding to a selected character, erasing means engageable with one code group, reading means for the memory elements, and means operated by the machine operator upon setting the platen in relation to a typed character to set the erasing means in operative relation to the code group corresponding to said character.

11. In a photographic composing machine, a register comprising, in combination, a stationary storage section having horizontal rows of memory elements arranged in code groups, selector means to be coupled to a typewriter platen engageable with said memory elements, and a reading section for the memory elements arranged to read a stored line in one part of the storage section while the selector means is storing a new line in another part of the storage section.

12. In a photographic composing machine, the combination of a typewriter platen, a stationary storage section having horizontal rows of memory pins arranged in code groups, selector means movable with the platen to enter a typed character in the storage section, sensing means to detect the positions of a group of the pins, correction means engageable with said pins, and a reading section for the pins arranged to read a stored line in one part of the storage section while the selector means is storing a new line in another part of the storage section.

13. In type composing apparatus, the combination of a storage section having a number of memory elements, a typewriting machine having a platen carriage movable relative to the storage section, a selector and erasing means movable with the carriage and selectively engageable with the memory elements, and means operated upon the machine operator setting the platen in relation to a typed faulty character to cause the erasing means to reset the memory elements corresponding to said character.

14. In type composing apparatus, the combination of a storage section having a number of memory elements, a typewriting machine having a platen carriage movable relative to the storage section, a selector, sensing means and erasing means movable with the carriage, the selector being selectively engageable with the memory elements to store information, the sensing means being operable to detect the positions of memory elements corresponding to any stored character, and the erasing means being operable to reset said memory elements, and means operated by the machine operator upon setting the platen in relation to a typed faulty character to cause the sensing and erasing means to be operative upon the memory elements corresponding to said character.

15. In type composing apparatus, the combination of a storage section having a number of memory elements, a typewriting machine having a platen carriage movable relative to the storage section, a selector, sensing means and erasing means movable with the carriage, the selector being selectively engageable with the memory elements to store information, the sensing means being operable to detect the positions of memory elements corresponding to any stored character, and the erasing means being operable to reset said memory elements, contacts actuated by the sensing means to transmit the width of said character, and means operated by the machine operator upon setting the platen in relation to a typed faulty character to cause the sensing and erasing means to be operative upon the memory elements corresponding to said character.

16. In type composing apparatus, the combination of a storage section having a number of memory elements, a selector section selectively engageable with the memory elements to store information, a reading section movable independently of the selector section and arranged to read the stored information in one part of the storage section while the selector section is storing information in another part of the storage section, and means to prevent the selector and reading sections from reaching operative relationship with the same part of the storage section.

17. In type composing apparatus, the combination of a storage section having a number of memory elements, a typewriting machine having a platen carriage movable relative to the storage section, a selector section movable with the carriage and selectively engageable with the memory elements to store information, a reading section movable independently of the selector section and arranged to read the stored information in one part of the storage section while the selector section is storing information in another part of the storage section, and means to prevent the selector and reading sections from reaching operative relationship with the same part of the storage section.

18. In type composing apparatus, the combination of a storage section having a number of rows of memory elements, the elements in a row being separated by a fixed distance, a typewriting machine having a platen carriage movable relative to the storage section in equal steps, a selector section movable with the carriage in steps equal to said distance and selectively engageable with the memory elements to store information, and a reading section movable independently of the selector section and arranged to read the stored information in one part of the storage section while the selector section is storing information in another part of the storage section.

19. In type composing apparatus, the combination of a storage section having a number of memory elements, a typewriting machine having a platen carriage movable relative to the storage section, a selector section movable with the carriage and selectively engageable with the memory elements to store information, a reading section including resetting means movable independently of the selector section and arranged to progressively read and reset the memory elements corresponding to a stored line while the selector section follows the reading section and progressively stores a new line in said elements, and means to prevent the selector and reading sections from reaching operative relationship with the same memory elements.

References Cited in the file of this patent

UNITED STATES PATENTS

| Number | Name | Date |
|---|---|---|
| 584,364 | Johnson | June 15, 1897 |
| 2,243,875 | Macomic | June 3, 1941 |
| 2,398,457 | Wallach | Apr. 16, 1946 |
| 2,402,750 | Heubner | June 25, 1946 |